United States Patent
Wang et al.

(10) Patent No.: US 9,276,975 B2
(45) Date of Patent: Mar. 1, 2016

(54) METHOD AND APPARATUS FOR MONITORING QUALITY OF SERVICE OF NETWORK

(75) Inventors: Xianlei Wang, Beijing (CN); Renlei Chen, Beijing (CN); Ning Liao, Beijing (CN)

(73) Assignee: Thomson Licensing, Issy-les-Moulineaux (FR)

( * ) Notice: Subject to any disclaimer, the term of this patent is extended or adjusted under 35 U.S.C. 154(b) by 101 days.

(21) Appl. No.: 13/634,851

(22) PCT Filed: Mar. 24, 2010

(86) PCT No.: PCT/CN2010/000362
§ 371 (c)(1),
(2), (4) Date: Sep. 13, 2012

(87) PCT Pub. No.: WO2011/116494
PCT Pub. Date: Sep. 29, 2011

(65) Prior Publication Data
US 2013/0021937 A1    Jan. 24, 2013

(51) Int. Cl.
*H04L 12/26* (2006.01)
*H04L 29/06* (2006.01)
*H04L 12/24* (2006.01)

(52) U.S. Cl.
CPC ........ *H04L 65/4076* (2013.01); *H04L 41/5009* (2013.01); *H04L 65/80* (2013.01)

(58) Field of Classification Search
None
See application file for complete search history.

(56) References Cited

U.S. PATENT DOCUMENTS

| | | | |
|---|---|---|---|
| 7,058,727 B2* | 6/2006 | Dingsor et al. | 709/245 |
| 7,263,555 B2* | 8/2007 | Banerjee et al. | 709/226 |
| 2002/0083199 A1* | 6/2002 | Dingsor et al. | 709/245 |
| 2002/0141352 A1* | 10/2002 | Fangman et al. | 370/254 |
| 2004/0128665 A1 | 7/2004 | Gouleau et al. | |
| 2005/0002395 A1 | 1/2005 | Kondo | |
| 2005/0128963 A1* | 6/2005 | Gazda et al. | 370/278 |
| 2005/0238022 A1 | 10/2005 | Panigrahy | |
| 2007/0183418 A1* | 8/2007 | Riddoch et al. | 370/389 |

(Continued)

FOREIGN PATENT DOCUMENTS

| | | |
|---|---|---|
| CN | 101051961 A | 10/2007 |
| CN | 101217464 | 7/2008 |
| CN | 101499965 | 8/2009 |
| EP | 1858199 A2 | 11/2007 |

(Continued)

OTHER PUBLICATIONS

Search Rept: Dec. 30, 2010.

*Primary Examiner* — Sulaiman Nooristany
(74) *Attorney, Agent, or Firm* — Myers Wolin LLC

(57) ABSTRACT

When capturing packets at the application level for the purpose of QoS monitoring, a QoS monitor needs to be bound to the same IP address and port as those of a media player. However, due to the unicast duplicate binding problem, a unicast packet captured by the QoS monitor will not be received by the media player, which means the QoS monitor have affected the operation of the media player. The present invention provides a solution to make the QoS monitor, upon the receipt of a unicast packet, forward the packet to the socket of the media player. In order to guarantee that the forwarded packet can be received by the socket of the media player, the QoS monitor needs to keep the port unchanged and replace the destination IP address with the local host address (127.0.0.1). According to the invention, the QoS monitor can sniff the media player without interference to the normal operation of the media player.

11 Claims, 6 Drawing Sheets

(56) References Cited

U.S. PATENT DOCUMENTS

| | | |
|---|---|---|
| 2008/0028071 A1 | 1/2008 | Miyajima |
| 2009/0135835 A1 | 5/2009 | Gallatin et al. |
| 2009/0271512 A1 | 10/2009 | Jorgensen |
| 2011/0175976 A1* | 7/2011 | Cho .......................... 348/14.02 |

FOREIGN PATENT DOCUMENTS

| | | |
|---|---|---|
| JP | 2001209503 A2 | 8/2001 |
| JP | 2004535704 A | 11/2004 |
| JP | 2009171357 A2 | 7/2009 |
| WO | 9900938 A1 | 1/1999 |

* cited by examiner

_US 9,276,975 B2_

METHOD AND APPARATUS FOR MONITORING QUALITY OF SERVICE OF NETWORK

This application claims the benefit, under 35 U.S.C. §365 of International Application PCT/CN2010/000362, filed Mar. 24, 2010, which was published in accordance with PCT Article 21(2) on Sep. 29, 2011 in English.

FIELD OF THE INVENTION

The present invention relates to method and apparatus for monitoring quality of service (QoS) of network.

BACKGROUND OF THE INVENTION

In a TCP/IP communication network, a session between two applications on different hosts needs to be established for a communication therebetween, which is usually composed of source IP address and port as well as destination IP address and port. When a host is created for a specific session (a host is a kind of application programming interface through which the application can access TCP/IP protocol stack to implement inter-application communication), packets in the session can be received or sent through it.

For a TCP/IP network QoS monitor at an application level, it is a general idea to bind the socket of a sniffing application of the monitor to the same destination IP address and port as those of an application to be monitored.

SO_REUSEADDR is one of the generic socket options, which allows completely duplicate bindings: if a pair of IP address and port has already been bound to one socket, then the same pair can be bound to another socket if the transport protocol support this feature. Normally this feature is supported only for UDP (User Datagram Protocol) sockets.

This feature is used in multicasting to allow one or more applications to run multiple times on the same host simultaneously. When a UDP datagram which is destined for either a broadcast IP address or a multicast IP address arrives, every bound socket of the multiple applications is able to receive a copy of the datagram. However, a datagram which is destined for a unicast address can be delivered to only one socket. If there are multiple sockets that match a unicast datagram, the result of which socket will receive the datagram is implementation-dependent. That is to say, among the bound sockets in unicast sessions, only one indefinite socket can receive the unicast packets. This is called the unicast duplicate binding problem (UDBP).

SUMMARY OF THE INVENTION

According to one aspect of the invention, a communication method of two socket-bound applications in conformity with TCP/IP protocol is provided, wherein the sockets of the two applications are bound to the same IP address and port. The method comprising, at the level of either application, the steps of: upon the detection of a unicast packet received in its socket, replacing the destination IP address of the unicast packet with the local host address (127.0.0.1) and forwarding the unicast packet.

According to another aspect of the invention, a Quality of Service monitor for a media player is provided. The socket of the Quality of Service monitor is bound to that of the media player for capturing media plackets sent to the media player. The monitor comprises: means for detecting whether a captured media packet is a unicast one; and means for replacing the destination IP address of the captured unicast media packet with the local host address (127.0.0.1) and forwarding the packet.

BRIEF DESCRIPTION OF DRAWINGS

These and other aspects, features and advantages of the present invention will become apparent from the following description in connection with the accompanying drawings in which.

DETAIL DESCRIPTION OF PREFERRED EMBODIMENTS

In the following description, various aspects of an embodiment of the present invention will be described. For the purpose of explanation, specific configurations and details are set forth in order to provide a thorough understanding. However, it will also be apparent to one skilled in the art that the present invention may be practiced without the specific details present herein.

To improve the accuracy of QoE (Quality of Experience) assessment of media applications or services, the QoS (Quality of Service) of a communication network needs to be monitored or measured. There are some known network QoS measurement methods, all of which need to sniff the interested packets. Then the captured packets can be traced and analyzed to get real-time QoS metrics, such as PLR (Packet Loss Rate), PLF (Packet Burst Loss Frequency), etc.

Media packets can be captured at different layers in TCP/IP protocol stack. For example, raw packets can be captured at the data-link layer by BPF (BSD (Berkeley Software Distribution) Packet Filter). However, according to an architectural principle known as Application Level Framing (ALF) which is based on a concept that applications understand their own needs better, it is preferable to sniff media packets at the application level.

When capturing packets at the application level for the purpose of QoS monitoring, a QoS monitor needs to be bound to the same IP address and port as those of a media player. In this case, it is important that the bound QoS monitor should not interfere with the operation of the media player.

Figure 1:
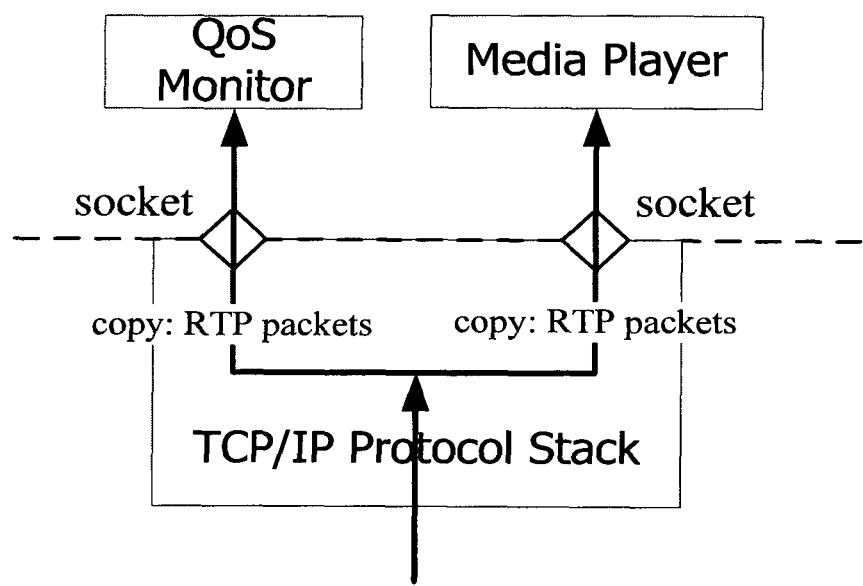
FIG. 1 is an exemplary diagram showing the internal operating mechanism of a multicast duplicate binding of the media player and the QoS monitor according to the prior art.
Figure 2A:
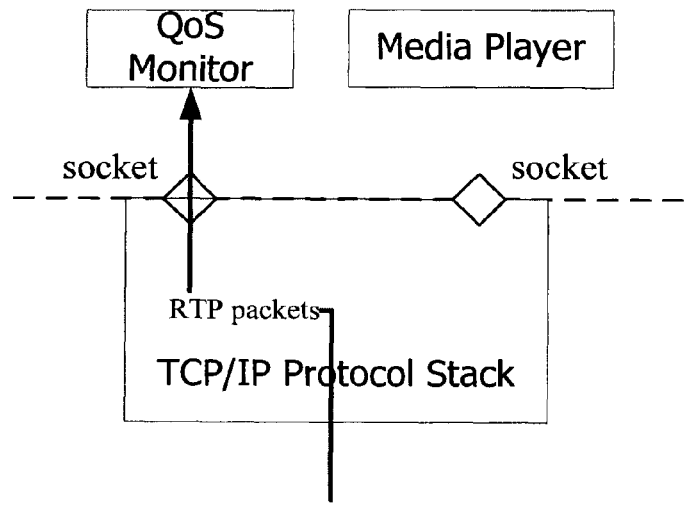
FIG. 2 is an exemplary diagram showing the internal operating mechanism of a unicast duplicate binding of the media player and the QoS monitor according to the prior art.
Figure 2B:
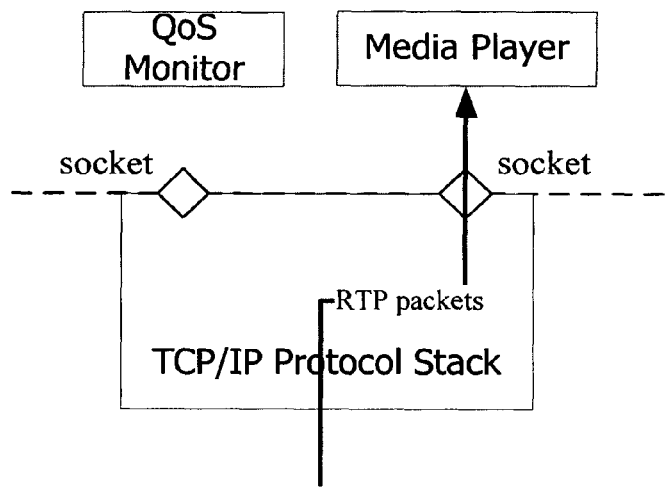

However, due to the above described UDBP, the media player can play a multicast session normally when the QoS monitor is sniffing, while it is not the case for a unicast session. This is shown respectively in FIGS. 1 and 2. FIG. 1 is an exemplary diagram showing the internal operating mechanism of a multicast duplicate binding of the media player and the QoS monitor. As shown in FIG. 1, when a packet arrives, the media player and the QoS monitor will gain a copy of the packet separately. FIG. 2 is an exemplary diagram showing the internal operating mechanism of a unicast duplicate binding of the media player and the QoS monitor. As shown in FIG. 2, only one of the bound devices, the QoS monitor (FIG. 2(a)) or the media player (FIG. 2(b)), can receive a unicast packet. That is, a unicast packet captured by the QoS monitor will not be received by the media player, which means the QoS monitor has affected the operation of the media player.

Figure 3:
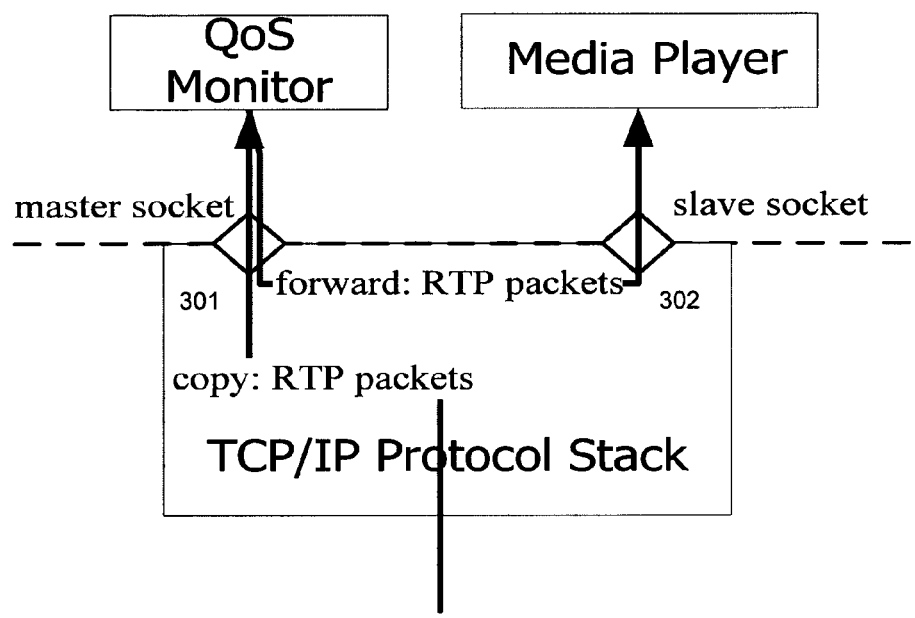
FIG. 3 is an exemplary diagram showing a QoS monitoring process according to an embodiment of the invention.

In view of the above problem, a solution is provided to make the QoS monitor, upon the receipt of a unicast packet, forward the packet to the socket of the media player. FIG. 3 is an exemplary diagram showing a QoS monitoring process according to an embodiment of the invention. As show in FIG. 3, when the QoS monitor detects that a unicast packet is received by its socket (master) 301, it will forward this unicast packet to the bound socket (slave) 302 of the media player. In order to guarantee that the forwarded packet can be received by the socket of the media player, the QoS monitor needs to keep the port unchanged and replace the destination IP address of the packet with the local host address (127.0.0.1). If the destination IP address is used, the forwarded packet will be received again by the QoS monitor itself, rather than by the socket of the media player.

Next, a process of a QoS monitor for sniffing a media player at the application level according to an embodiment of the invention will be described in detail.

Figure 4:
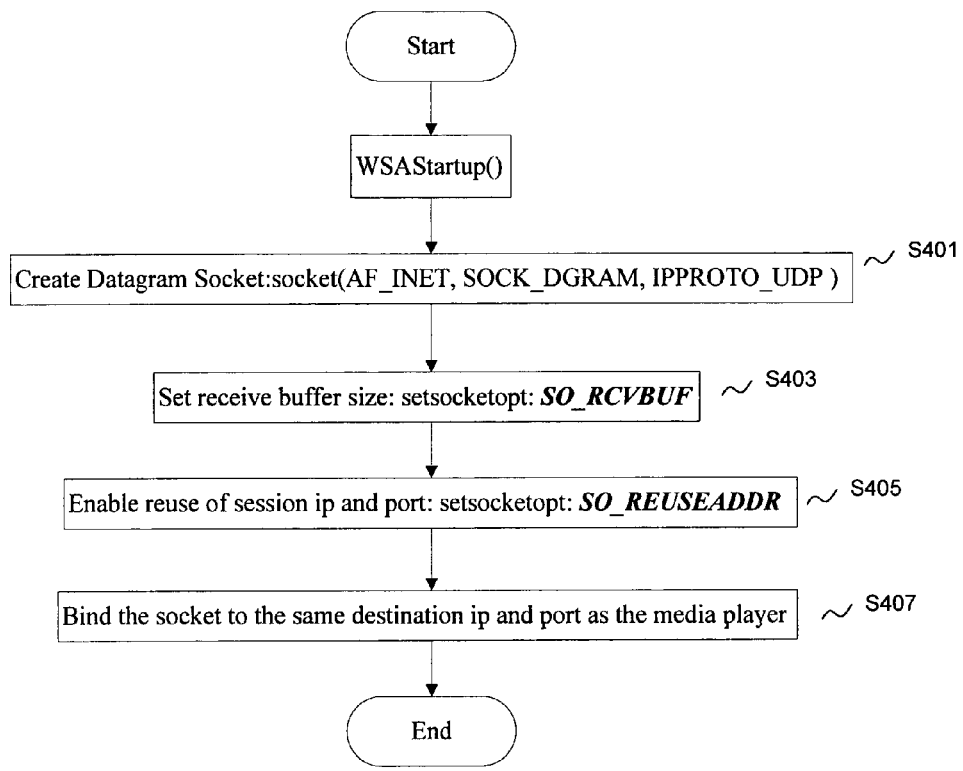
FIG. 4 is a flow chart showing the process of creating the duplicate binding socket for the QoS monitor.

In order to monitor media packets of a media player, a QoS monitor needs to bind its socket to the same destination IP address and port as the media player. FIG. 4 is a flow chart showing the process of creating the duplicate binding socket for the QoS monitor.

As shown in FIG. 4, at the step S401, the QoS monitor creates a datagram socket by calling socket (AF_INET, SOCK_DGRAM, IPPROTO_UDP) which returns a socket ID for other socket functions to refer to.

Next, the QoS monitor sets receiver buffer size at the step S403 and enables reuse of session IP and port at the step S405 by setsocketopt( ) call with arguments SO_RCVBUF and SO_REUSEADDR respectively.

Then at the step S407, the QoS monitor binds its socket to the same destination IP address and port as the media player by bind( ) call.

Figure 5:
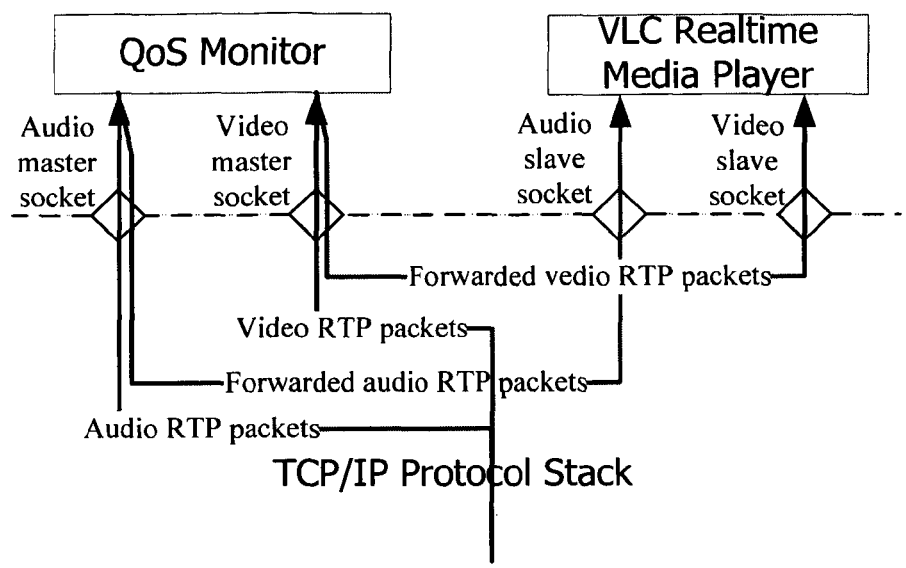
FIG. 5 is an exemplary diagram showing separate processing of audio and video packets.

In current multimedia communication, normally audio and video packets are transmitted in different sessions with different ports. Therefore, the QoS monitor will receives audio and video packets respectively by its different master sockets, and forward (if needed) the audio and video packets to respective slave sockets of the media player. This process is shown in FIG. 5.

Figure 6:
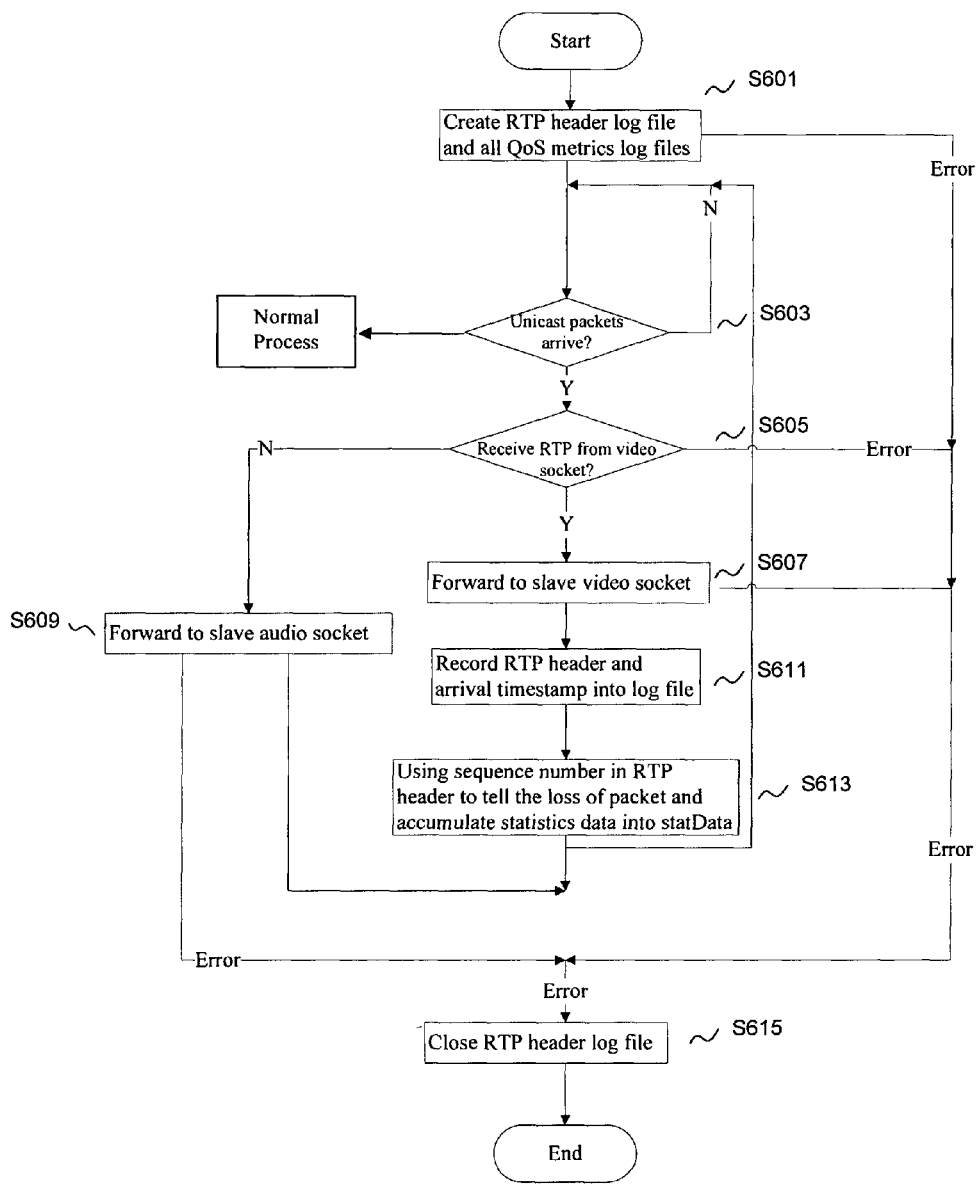
FIG. 6 is a flow chart showing a process for monitoring video QoS of media player by the QoS monitor according to the embodiment of the invention.

FIG. 6 is a flow chart showing a process for monitoring video QoS of media player by the QoS monitor according to the embodiment of the invention.

As shown in FIG. 6, the QoS monitor firstly creates RTP (Real-time Transport Protocol) header log file and all QoS metrics log files at the step S601.

Then the QoS monitor determines at the step S603 whether a unicast packet arrives by monitoring this socket using select( ) call. If the result is "Yes", the QoS monitor will determine at the step S605 whether a video packet is received via the type of socket through which this packet arrived. It can be appreciated by a person skilled in the art that if the result is "No", which means a multicast or broadcast packet is received, the normal process instead of the method of the embodiment of the invention will be applied.

If the result of the step S605 is "Yes", at the step S607 the monitor will replace the destination IP address of the unicast video packet with the local host address (127.0.0.1) and forward the packet to the video socket of the media player. If the result of the step S605 is "No", which means that an audio packet is received, at the step S609 the QoS monitor will replace the destination IP address of the unicast audio packet with the local host address (127.0.0.1) and forward the packet to the audio socket of the media player.

Since the QoS monitor in the embodiment is used to evaluate the video QoS of the media player, for the captured video packets, the QoS monitor will analyze the packet to update the statistics data of QoS metrics. Specifically at the step S611 the monitor records RTP header and arrival timestamp into log file and at the step S613 it uses sequence number in RTP header to determine the loss of packet and accumulate statistical data, for example, into statData which is a data structure for accumulating statistical data, including PLR, PLL, PLF and PDR.

In this embodiment, the QoS monitor directly forwards the received unicast audio packets to audio slave socket. However, it can be appreciated by a person skilled in the art that audio packets can also be analyzed if needed.

As shown in FIG. 6, if there is an error in any one of the steps S601, S605, S607 and S609, the RTP header log file will be closed at the step S615.

The principle of the invention was described with reference to a QoS monitor of a media player. However, it can be appreciated by a person skilled in the art that the invention can be applied to all two bound applications for purpose of overcoming the unicast duplicate binding problem as described above.

It is to be understood that numerous modifications may be made to the illustrative embodiments and that other arrangements may be devised without departing from the spirit and scope of the present invention as defined by the appended claims.

The invention claimed is:

1. A communication method of two socket-bound applications in conformity with TCP/IP protocol wherein the sockets of the two applications are bound to the same IP address and the same port, the method comprising:
   capturing, by a first application, a packet in a socket of the first application, the packet being intended for a second application;
   detecting, by the first application, whether the packet intended for the second application is a unicast packet;
   if the packet is a unicast packet, replacing, by the first application, a destination IP address of the packet with a local host address without changing a port; and
   forwarding, by the first application, the packet for reception at said socket for the second application, the two socket-bound applications comprising a media playing application and a sniffer application.

2. A Quality of Service monitor for a media player, said Quality of Service monitor including:
   a memory;
   a processor configured to:
      initiate a socket;
      associate the socket with the Quality of Service monitor;
      bind the socket to another socket associated with the media player for capturing media packets sent to the media player such that an IP address and port of the socket associated with the Quality of Service monitor is the same as those of the media player;
   detect whether a captured media packet is a unicast packet;
   upon detecting that the media packet is said unicast packet, process the media packet as follows:
      replace a destination IP address of the media packet with a local host address without changing a port; and
      forward the media packet for reception at said socket for the media player.

3. The communication method defined in claim 1, wherein said socket for the second application includes a video socket and an audio socket.

4. The communication method defined in claim 3, wherein said detecting includes determining, by the first application, whether the packet is an audio packet or a video packet.

5. The Quality of Service monitor for the media player defined in claim 2, wherein said socket for the media player includes a video socket and an audio socket.

6. The Quality of Service monitor for the media player defined in claim 5, wherein to detect whether the media packet is unicast said processor is further configured to determine whether the packet is an audio packet or a video packet.

7. A non-transitory computer-readable medium having one or more executable instructions stored thereon, which when executed by a processor cause the processor to perform a communication method between two socket-bound applications in conformity with TCP/IP protocol wherein the sockets of the two applications are bound to the same IP address and the same port, the method comprising:
   detecting, by a first application, whether a packet intended for a second application and received in said socket of the first application is a unicast packet;
   if the packet is a unicast packet, replacing, by the first application, a destination IP address of the packet with a local host address without changing a port; and
   forwarding, by the first application, the packet for reception at said socket for the second application, the two socket-bound applications comprising a media playing application and a sniffer application.

8. The communication method defined in claim 4, wherein said forwarding comprises:
   forwarding, by the first application, the packet to the audio socket for the second application when the packet is determined to be the audio packet; and
   forwarding, by the first application, the packet to the video socket for the second application when the packet is determined to be the video packet.

9. The Quality of Service monitor for the media player defined in claim 6, wherein to forward the media packet the processor is further configured to:
   forward the media packet to the audio socket for the media player when the media packet is determined to be the audio packet; and
   forward the media packet to the video socket for the media player when the media packet is determined to be the video packet.

10. The non-transitory computer-readable medium of claim 7, wherein said socket includes a video socket and an audio socket.

11. The non-transitory computer-readable medium of claim 10, wherein the detecting of whether the packet is unicast comprises determining whether the packet is an audio packet or a video packet.

\* \* \* \* \*